United States Patent
Akahori et al.

(10) Patent No.: US 11,618,556 B2
(45) Date of Patent: Apr. 4, 2023

(54) LUBRICATION PRESSUE CONTROL OF A POWER TRANSMISSION DEVICE FOR HELICOPTER

(71) Applicant: KAWASAKI JUKOGYO KABUSHIKI KAISHA, Kobe (JP)

(72) Inventors: Hirofumi Akahori, Akashi (JP); Yuji Yamazaki, Akashi (JP); Takahiko Banno, Kobe (JP); Akira Hayasaka, Kobe (JP); Kenta Ogasawara, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 159 days.

(21) Appl. No.: 16/722,354

(22) Filed: Dec. 20, 2019

(65) Prior Publication Data
US 2020/0122824 A1 Apr. 23, 2020

Related U.S. Application Data

(63) Continuation of application No. PCT/JP2018/024132, filed on Jun. 26, 2018.

(30) Foreign Application Priority Data

Jun. 27, 2017 (JP) .............................. JP2017-124892

(51) Int. Cl.
*F16H 57/04* (2010.01)
*F16N 7/40* (2006.01)
(Continued)

(52) U.S. Cl.
CPC ......... *B64C 27/12* (2013.01); *F16H 57/0417* (2013.01); *F16H 57/0435* (2013.01);
(Continued)

(58) Field of Classification Search
CPC .... F16H 57/0435; F16H 57/0436; F16N 7/40; F16N 23/00; F16N 2280/00
See application file for complete search history.

(56) References Cited

U.S. PATENT DOCUMENTS 5,121,815 A * 6/1992 Francois ................. B64C 27/12
184/6.12
6,053,137 A * 4/2000 Trzmiel ................. F01M 11/08
123/90.17
(Continued)

FOREIGN PATENT DOCUMENTS

JP 2007-008461 A 1/2007

*Primary Examiner* — Minh Truong
(74) *Attorney, Agent, or Firm* — Sughrue Mion, PLLC

(57) ABSTRACT

A transmission device includes a casing accommodating a transmission gear and having an oil sump for retaining oil. The oil in the oil sump flows from a lubrication pump through a lubrication passage and is injected to the transmission gear. A connection portion is provided in a part of the lubrication passage, which part is disposed outside the casing. A direction control valve is provided downstream of the lubrication pump and upstream of the connection portion in the lubrication passage with respect to a flow direction of the oil. The direction control valve is configured to open the lubrication passage when a hydraulic pressure in the lubrication passage exceeds a predetermined value and to close the lubrication passage when the hydraulic pressure is equal to or lower than the predetermined value.

1 Claim, 2 Drawing Sheets

(51) Int. Cl.
   *F16N 23/00* (2006.01)
   *B64C 27/12* (2006.01)
   *F16N 19/00* (2006.01)

(52) U.S. Cl.
   CPC ..... *F16H 57/0436* (2013.01); *F16H 57/0456* (2013.01); *F16N 7/40* (2013.01); *F16N 19/00* (2013.01); *F16N 23/00* (2013.01); *F16N 2210/08* (2013.01); *F16N 2280/00* (2013.01)

(56) References Cited

U.S. PATENT DOCUMENTS

| | | | | |
|---|---|---|---|---|
| 6,390,947 | B1* | 5/2002 | Aoki | B60W 10/06 477/3 |
| 7,137,590 | B2* | 11/2006 | Sandrart | B64C 27/12 244/17.25 |
| 7,651,049 | B2 | 1/2010 | Carnelli et al. | |
| 8,702,562 | B2* | 4/2014 | Zhang | B60W 30/18018 477/52 |
| 8,708,855 | B2* | 4/2014 | Matsushita | F16H 57/0413 475/5 |
| 9,108,499 | B2* | 8/2015 | Long | F16H 61/0206 |
| 9,488,317 | B2* | 11/2016 | Wright | B60W 20/00 |
| 9,702,381 | B2* | 7/2017 | Morita | F15B 11/17 |
| 9,835,243 | B2* | 12/2017 | Filippin | F16H 57/0446 |
| 10,012,305 | B2* | 7/2018 | Louis | B64D 35/00 |
| 10,197,151 | B2* | 2/2019 | Nishimine | F16H 57/0441 |
| 10,837,329 | B2* | 11/2020 | Parrish | F01M 11/08 |
| 2009/0071753 | A1 | 3/2009 | Carnelli et al. | |
| 2012/0061184 | A1* | 3/2012 | Craft | F16N 13/22 184/6.12 |
| 2014/0048355 | A1* | 2/2014 | Pfleger | F16H 57/0436 184/26 |
| 2015/0192150 | A1* | 7/2015 | Matsushita | B60W 10/30 60/420 |
| 2016/0123457 | A1 | 5/2016 | Harreau | |
| 2016/0363208 | A1 | 12/2016 | Louis | |
| 2021/0088124 | A1* | 3/2021 | Remboski | F16H 57/0435 |

\* cited by examiner

LUBRICATION PRESSUE CONTROL OF A POWER TRANSMISSION DEVICE FOR HELICOPTER

CROSS REFERENCE TO THE RELATED APPLICATION

This application is a continuation application, under 35 U.S.C. § 111(a) of international patent application No. PCT/JP2018/024132, filed Jun. 26, 2018, which claims priority to Japanese patent application No. 2017-124892, filed Jun. 27, 2017, the entire disclosures of all of which are herein incorporated by reference as a part of this application.

BACKGROUND OF THE INVENTION

Field of the Invention

The present invention relates to a transmission device (transmission) for a helicopter.

Description of Related Art

Transmission devices for helicopters include a casing for accommodating a rotating member, such as a transmission gear, the casing being provided with an oil sump for retaining oil. The oil in the oil sump is injected to the rotating member through a lubrication passage. A part of the injected oil remains as oil mist in an inner space of the casing. The rest of the oil is collected in the oil sump. For the reasons of, e.g., necessity of cooling the oil by heat radiation and matters in installation space within the casing, a part of the lubrication passage is disposed outside the casing.

In such a transmission device for a helicopter, there is a demand for a dry-run capability that allows the helicopter to operate even in a state where oil supply is interrupted. Although current technology ensures a necessary dry-run capability, further enhancement in the dry-run capability is desired because of recent trends, such as increasing occasions of over water flights. As current measure against dry running, reserving emergency oil for continuing the supply in case of emergency has been known (for example, Patent Document 1).

RELATED DOCUMENT

Patent Document

[Patent Document 1] JP Laid-open Patent Publication No. 2007-008461

Although there are various causes of dry running (oil interruption), it is difficult to take measures against, among others, a situation where an oil leak out of a casing occurs from a conduit because of e.g. a failure or a fall of a component of a lubrication passage and the oil is discharged out of the casing due to discharge pressure of a lubrication pump. If this situation continues, even the oil mist inside the casing may possibly be discharged outside the casing. In Patent Document 1 listed below, it is possible to secure emergency oil, but not to prevent oil from flowing out of a casing.

SUMMARY OF THE INVENTION

An object of the present invention is to provide a transmission device capable of preventing oil from flowing out of a casing during dry-run time.

In order to achieve the above object, a transmission device for a helicopter according to a first aspect of the present invention includes: a casing accommodating a rotating member and having an oil sump configured to retain oil in a liquid form; a lubrication pump configured to suck and discharge the oil from the oil sump; a supply port configured to inject the oil from the lubrication pump to the rotating member; a lubrication passage connecting the lubrication pump and the supply port; a connection portion provided in a part of the lubrication passage, which part is disposed outside the casing; and a direction control valve provided downstream of the lubrication pump and upstream of the connection portion in the lubrication passage with respect to a flow direction of the oil. An inner space of the casing contains oil in a mist form. The lubrication pump, the supply port and the direction control valve are provided in the inner space of the casing. The direction control valve is configured to open the lubrication passage when a hydraulic pressure in the lubrication passage exceeds a predetermined value and to close the lubrication passage when the hydraulic pressure is equal to or lower than the predetermined value.

The expression "part of the lubrication passage, which part is disposed outside the casing" used herein means a part where the oil leaks out of the casing when a failure occurs. That is, in the rest part of the lubrication passage excluding the "part which is disposed outside the casing," the oil leaks within the casing when a failure, such as a fall of a component, occurs. The hydraulic pressure becomes the predetermined value or lower, for example, when the helicopter comes into a dry-run state. The direction control valve is, for example, a check valve configured to open the lubrication passage when a pressure upstream of the check valve exceeds the predetermined value.

When the oil flows out of the casing because a failure occurs in the connection portion disposed outside the casing or because the connection portion falls off, the pressure within the lubrication passage decreases. According to this configuration, when the hydraulic pressure in the lubrication passage becomes a predetermined value or lower, the direction control valve closes the lubrication passage. This makes it possible to prevent the discharge pressure of the lubrication pump from being applied to the lubrication passage, thereby to prevent the oil from further flowing out of the casing.

Where the direction control valve is a check valve, the transmission device may further include a discharge passage that is branched at a location between the lubrication pump and the check valve in the lubrication passage and is configured to discharge the oil upstream of the check valve in the lubrication passage into the inner space of the casing. According to this configuration, since the pressure upstream of the check valve is lowered due to the discharge passage, it is possible to make the check valve smaller because a force for preventing backflow is reduced, and also, to suppress pressure loss during normal operation because the pressure at which the check valve operates to open can be lowered.

Where the discharge passage is provided, the discharge passage may have a restriction part. According to this configuration, the restriction part makes it possible to adjust the pressure upstream of the check valve. In such a case, the restriction part may generate a predetermined set pressure within the discharge passage, and the predetermined set pressure may be lower than the predetermined value at which the direction control valve closes. According to this configuration, the restriction part suppresses a pressure decrease in the lubrication passage during normal operation.

In the first aspect of the present invention, the connection portion may be, for example, an oil cooler configured to cool the oil in the lubrication passage. The oil cooler has better heat exchanging efficiency when provided outside the casing. Thus, even where a part of the lubrication passage is disposed outside the casing, the oil does not flow out of the casing from the oil cooler because, according to the above aspect, the oil is not supplied to the oil cooler during dry-run time, thanks to the direction control valve.

In the first aspect of the present invention, the lubrication passage may include: an oil reservoir provided upstream of the supply port; and an opening provided upstream of an outlet of the oil reservoir and above the outlet of the oil reservoir. According to this configuration, when the hydraulic pressure in the lubrication passage is decreased because of a failure in the lubrication passage, air is taken into the lubrication passage through the opening. Thus, the oil in the oil reservoir is dripped to a lubrication target located downstream of the oil reservoir. This configuration makes it possible to perform both of oil lubrication during normal time and dripping lubrication during dry-run time, without providing a dedicated tank for dry-run time. Thus, it is possible to suppress a decrease in the oil mist in the inner space of the casing while continuing the oil supply by dripping lubrication during dry-run time.

A transmission device for a helicopter according to a second aspect of the present invention includes: a casing accommodating a rotating member and having an oil sump configured to retain oil in a liquid form; a lubrication pump configured to suck and discharge the oil from the oil sump; a supply port configured to inject the oil from the lubrication pump to the rotating member; a lubrication passage connecting the lubrication pump and the supply port; and a direction control valve provided in the lubrication passage. An inner space of the casing contains oil in a mist form. The lubrication pump, the supply port and the direction control valve are provided in the inner space of the casing. The lubrication passage includes: an external passage part disposed outside the casing; a first internal passage part disposed inside the casing and located downstream of the lubrication pump and upstream of the external passage part with respect to a flow direction of the oil; and a second internal passage part disposed inside the casing and located downstream of the external passage part and upstream of the supply port. The direction control valve is provided in the first internal passage part and is configured to open the lubrication passage when a hydraulic pressure in the first internal passage part exceeds a predetermined value and to close the first internal passage part when the hydraulic pressure is equal to or lower than the predetermined value.

The second aspect makes it possible to prevent the oil from flowing out of the casing, as in the first aspect described above.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF THE EMBODIMENTS

Hereinafter, preferred embodiments of the present invention will be explained with reference to the drawings. In the following description, the term "normal time" refers to a period of time when a helicopter operates in a state where lubrication oil is normally supplied and circulated in a transmission device (transmission) of the helicopter. The term "dry-run time" refers to a period of time when a helicopter operates in a state where lubrication oil contained in a transmission device of the helicopter is leaking.

Figure 1:
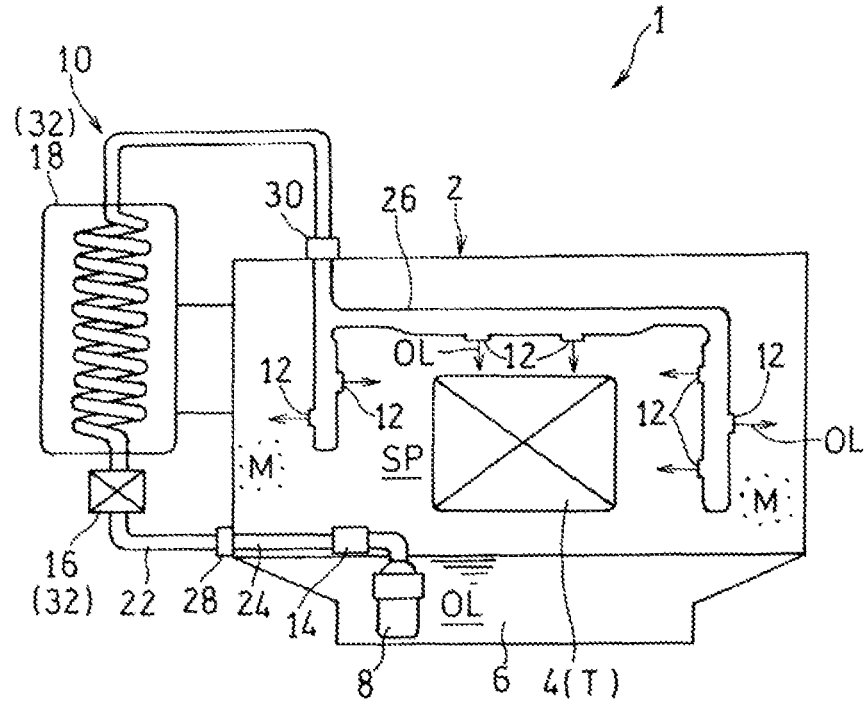
FIG. 1 is a system diagram of a lubrication system of a transmission device according to a first embodiment of the present invention.

FIG. 1 shows a lubrication system diagram of a transmission device 1 for a helicopter according to a first embodiment of the present invention. The transmission 1 includes a casing 2 and a transmission gear 4. The casing 2 forms an outer structure or outer shell of the transmission device 1. The casing 2 is formed with an oil sump 6. The oil sump 6 retains liquid oil OL for lubrication. In this embodiment, the oil sump 6 is formed by a part (central part) of a bottom wall of the casing 2, which part is recessed downward. In this embodiment, the oil sump 6 is integrally formed with the casing 2. The oil sump 6, however, is not limited to this configuration. For example, the oil sump 6 may be formed as a recess provided in a part of a side wall of the casing 2.

The transmission gear 4 is accommodated in the casing 2. The transmission gear 4 constitutes a rotating member of the transmission device 1. The transmission gear 4 is configured to change a speed of rotation of an engine (not illustrated) to transmit the rotation to a main rotor (not illustrated) and a tail rotor (not illustrated).

A lubrication target T of this embodiment is a rotating member of the transmission 1 of the helicopter. Specifically, the lubrication target T is the transmission gear 4 or a bearing part of a rotation shaft to which a gear is provided. In particular, where the lubrication target T is the transmission gear 4, the oil OL is preferably supplied to an engagement part of the gear.

The transmission device 1 further includes a lubrication pump 8, a lubrication passage 10, and a supply port 12. The lubrication pump 8 sucks and discharges the oil OL from the oil sump 6. The lubrication pump 8 is disposed within the oil sump 6. The lubrication pump 8 as a whole, however, is not necessarily provided within the oil sump 6, as long as a suction port of the pump or a conduit connected to the suction port is disposed within the oil sump 6. The lubrication pump 8 is not particularly limited and may be, for example, a gear pump. The oil OL discharged from the lubrication pump 8 passes through the lubrication passage 10 and is supplied to the lubrication target T.

The oil OL having passed the lubrication passage 10 is supplied to the lubrication target T through the supply port 12. The supply port 12 is formed in an inner space SP of the casing 2. The supply port 12 may be, for example, a jet nozzle. The supply port 12, however, is not limited to this configuration. For example, the supply port 12 may be a through-hole defined in a conduit constituting the lubrication passage 10. A part of the oil OL injected from the supply port 12 remains as oil mist M in a mist form in the inner space SP of the casing 2. That is, the inner space SP of the casing 2 contains the oil mist M. The rest of the oil OL is collected in the oil sump 6.

The lubrication passage 10 is a passage for supplying the oil OL which extends from the lubrication pump 8 to the supply port 12 for the lubrication target T. The lubrication passage 10 is provided with various devices therein and is mainly constituted of conduits. The lubrication passage 10 may include an internal passage that is integrally formed with a wall of the casing 2.

The lubrication passage 10 includes an external passage part 22, a first internal passage part 24, and a second internal passage part 26. The external passage part 22 is disposed outside the casing 2. The first internal passage part 24 is disposed inside the casing 2. Specifically, the first internal passage part 24 is located downstream of the lubrication pump 8 and upstream of the external passage part 22, with respect to a flow direction of the oil. The second internal passage part 26 is also disposed inside the casing 2. Specifically, the second internal passage part 26 is located downstream of the external passage part 22 and upstream of the supply port 12.

In this embodiment, the external passage part 22 and the first internal passage part 24 are communicated with each other via a first through part 28. The external passage part 22 and the second internal passage part 26 are also communicated with each other via a second through part 30. The first and second through parts 28, 30 are portions that pass through the walls of the casing 2. That is, in this embodiment, the part of the lubrication passage 10, which part is between the lubrication pump 8 and the first through part 28, forms the first internal passage part 24. The part between the first through part 28 and the second through part 30 forms the external passage part 22. Further, the part downstream of the second through part 30 forms the second internal passage part 26. It should be noted that as described later, the through parts 28, 30 are not necessarily provided between the external passage part 22 and the internal passage parts 24, 26.

The transmission device 1 further includes a direction control valve 14. The direction control valve 14 controls a flow direction of a fluid within a passage. The direction control valve 14 will be described later in detail. The transmission device 1 also includes an oil filter 16 and an oil cooler 18. The direction control valve 14 is provided downstream of the lubrication pump 8, with respect to the flow direction of the oil. The oil filter 16 filters the oil OL. The oil filter 16 is provided downstream of the direction control valve 14. The oil cooler 18 cools the oil OL. The oil cooler 18 is provided downstream of the oil filter 16. The oil filter 16 and/or the oil cooler 18 may be omitted in accordance with use condition.

In this embodiment, the oil filter 16 and the oil cooler 18 are provided in a part of the lubrication passage 10, which part is disposed outside the casing 2. On the other hand, the lubrication pump 8, the direction control valve 14 and the supply port 12 are disposed inside the casing 2. That is, the passage part between the lubrication pump 8 and the direction control valve 14 is also disposed inside the casing 2.

The expression "part of the lubrication passage 10, which part is disposed outside the casing 2" used herein means a part where the oil OL leaks out of the casing 2 when a failure occurs. That is, in the rest part of the lubrication passage excluding the "part which is disposed outside the casing 2," the oil leaks within the casing 2 when a failure, such as a fall of a component, occurs. The external passage part 22 includes the "part of the lubrication passage 10, which part is disposed outside the casing 2." For example, where the lubrication passage 10 is integrally formed with a side wall of the casing 2, if a component, such as a sensor or a gauge, is attached to the lubrication passage 10 from the outside of the casing 2, this passage part corresponds to a "part disposed outside the casing 2," i.e., to the external passage part 22. In such a case, there may be no through part between the external passage part 22 and the internal passage parts 24, 26.

In this embodiment, a connection portion 32 is disposed outside the casing 2. Specifically, the connection portion 32 is provided in the part of the lubrication passage 10, which part is disposed outside the casing 2, i.e., the external passage part 22. In this embodiment, each of the oil filter 16 and the oil cooler 18 constitutes the connection portion 32. The connection portion 32, for example, may include a device interposed in the passage, or an instrument attached through an opened part of the passage, or a part that connects conduits constituting the passage. The device interposed in the passage may include, for example, the oil filter 16 and the oil cooler 18 of this embodiment. The instrument attached through an opened part of the passage may include, for example, an oil jet (nozzle), a pressure sensor, a temperature sensor, and a conduit window for viewing flow of the oil, all of which are provided in the external passage part 22. The part that connects conduits may include, for example, a flange for connecting conduits and a coupling (joint). It should be noted that these are mere examples, and that the connection portion 32 is not limited to these components.

The direction control valve 14 is provided upstream of the connection portion 32, with respect to the flow direction of the oil. Specifically, the direction control valve 14 is provided in the first internal passage part 24 within the casing 2. In operation of the helicopter, the direction control valve 14 opens the lubrication passage 10 when a hydraulic pressure P1 in the lubrication passage 10 (first internal passage part 24) exceeds a predetermined value V1. In operation of the helicopter, the direction control valve 14 closes the lubrication passage 10 (first internal passage part 24) when the hydraulic pressure P1 in the lubrication passage 10 is equal to or lower than the predetermined value V1. The hydraulic pressure P1 becomes the predetermined value V1 or lower, for example, when the helicopter shifts from normal time to dry-run time. An example of dry running may include a situation where the oil discharged from the lubrication pump 8 leaks out to cause the oil surface in the oil sump 6 to be lowered, resulting in a decrease in the discharge pressure of the lubrication pump 8.

Figure 2:
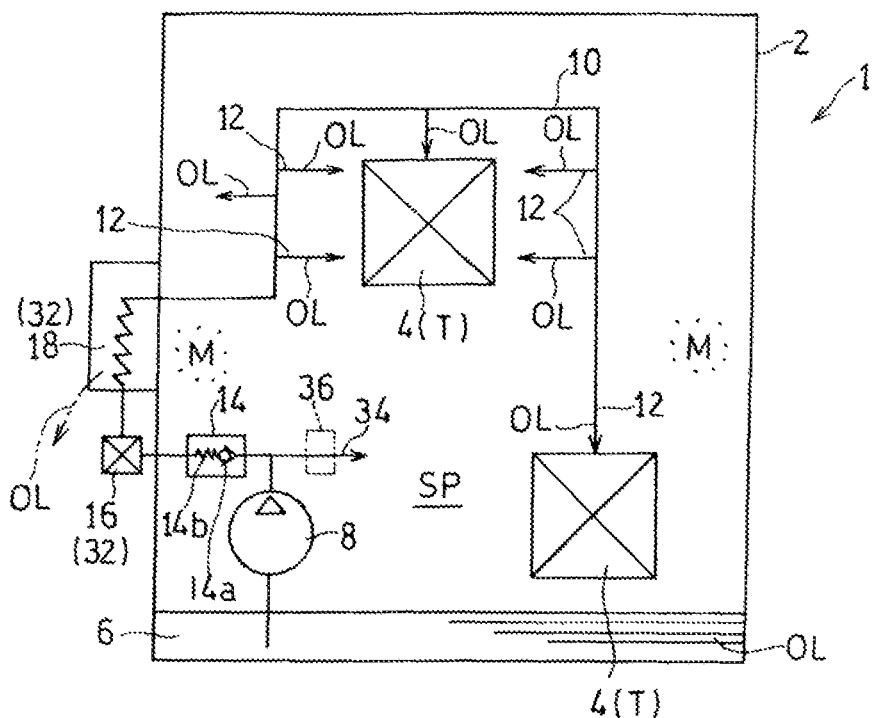
FIG. 2 is a simplified system diagram of the lubrication system of the transmission device.

In this embodiment, the direction control valve 14 is a check valve. That is, the direction control valve (check valve) 14 opens the lubrication passage 10 when the pressure upstream the valve exceeds the predetermined value V1. The check valve 14 includes a valve body 14a and a closing-force application member 14b as shown in FIG. 2. The closing-force application member 14b presses the valve body 14a in the valve closing direction. The closing-force application member 14b is, for example, a spring. The direction control valve 14, however, is not limited to a check valve. As long as the direction control valve 14 is operable to control a flow direction of the oil OL, it may be, for example, an electromagnetic switching valve.

FIG. 2 shows the lubrication system of the lubrication passage 10 in a simplified manner. In this embodiment, the transmission device 1 further includes a discharge passage 34. The discharge passage 34 is branched at a location between the lubrication pump 8 and the direction control valve 14 in the lubrication passage 10. The discharge passage 34 discharges the oil OL upstream of the direction control valve 14 in the lubrication passage 10 into the inside of the casing 2. The discharge passage 34, however, may be omitted.

As shown by a double dotted line in FIG. 2, a restriction part or choke part 36 may be provided in the discharge passage 34. The restriction part 36 generates a predetermined set pressure V2 within the discharge passage 34. The restriction part 36 is, for example, an orifice. The set pressure V2 of the restriction part 36 is set to be smaller than the predetermined value V1 of the direction control valve 14. Where the restriction part 36 is provided in the discharge passage 34, the pressure upstream of the check valve (direction control valve) 14 can be adjusted to be higher than the predetermined value V1.

Moreover, the set pressure V2 of the restriction part 36 is set to be smaller than the predetermined value V1 of the direction control valve 14, so as to suppress a pressure decrease during normal operation. The increased pressure of the oil OL by the lubrication pump 8 is quickly raised to the set pressure V2, without a pressure decrease. When the pressure of the oil OL exceeds the set pressure V2, a part of the oil OL passes through the restriction part 36 to be discharged into the casing 2 from the discharge passage 34. When the pressure of the oil OL exceeds the predetermined value V1, the check valve 14 opens. The restriction part 36, however, may be omitted.

The flow of the oil OL in the transmission device 1 of this embodiment will be described in detail. During normal time, the oil OL in the oil sump 6 is sucked and discharged by the lubrication pump 8. At such a time, when the pressure of the oil OL reaches the set pressure V2, a part of the oil OL is discharged into the casing 2 from the discharge passage 34. Thus, the pressure at the inlet of the check valve 14 is prevented from increasing excessively. The oil OL discharged from the discharge passage 34 is collected in the oil sump 6. Until the pressure of the oil OL reaches the predetermined value V1, the oil OL is blocked by the direction control valve 14. When the pressure of the oil OL exceeds the predetermined value V1, the oil OL passes through the direction control valve 14 and is, after having been filtered through the oil filter 16 outside the casing 2, cooled by the oil cooler 18.

The oil OL cooled by the oil cooler 18 then returns to the inside of the casing 2 and is supplied to the lubrication target T (transmission gear 4) through the supply port 12. The oil OL supplied through the supply port 12 lubricates the lubrication target T and is then collected in the oil sump 6. A part of the oil OL is injected through the supply port 12 into the inner space SP of the casing 2 and remains in the inner space SP as the oil mist M.

For example, as shown by a double dotted line in FIG. 2, where an oil leak occurs from the oil cooler 18 outside the casing 2, the hydraulic pressure P1 in the lubrication passage 10 decreases to bring the device to a dry-run state. When the hydraulic pressure P1 in the lubrication passage 10 decreases to the predetermined value V1 in this state, the direction control valve 14 closes. Thus, the oil supply from the lubrication pump 8 to the lubrication passage 10 is blocked by the direction control valve 14, thereby making it possible to prevent the oil OL from flowing out of the casing 2. Consequently, outflow of the oil OL in the oil sump 6 and the oil mist M in the inner space SP is suppressed. Therefore, the dry-run capability can be enhanced (i.e., duration of continuous flight can be increased).

In addition, the discharge passage 34 allows the pressure upstream of the check valve (direction control valve) 14 to be lowered. Thus, the check valve 14 can have a smaller closing-force application member 14b, thereby making it possible to compactly configure the check valve 14 as a whole. Further, the pressure V1 at which the check valve 14 operates can be lowered. Therefore, the pressure loss during normal operation can be suppressed.

The oil cooler 18 has difficulty in being disposed inside the casing 2 due to space constraints and has higher heat exchange efficiency when disposed outside the casing 2. Thus, according to the above configuration, even when a part of the lubrication passage 10 is disposed outside the casing 2, the direction control valve 14 is closed during dry-run time, and therefore, the oil OL is not supplied to the outside of the casing 2. As a result, the oil OL does not flow out of the casing 2.

Figure 3:
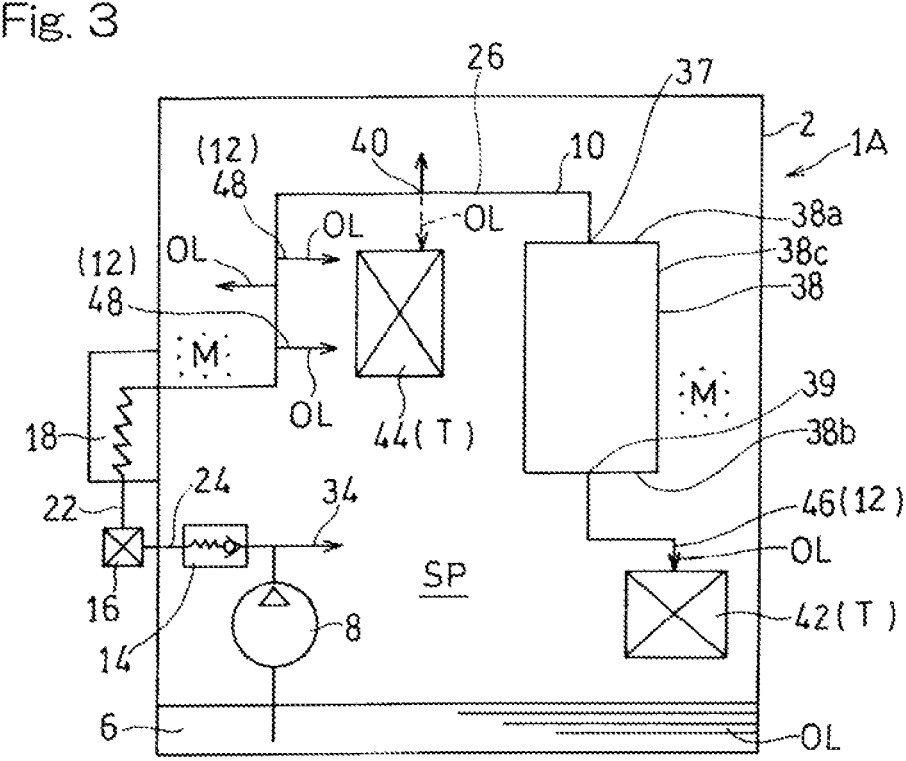
FIG. 3 is a system diagram of a lubrication system of a transmission device according to a second embodiment of the present invention.

FIG. 3 is a system diagram illustrating, in a simplified manner, a lubrication system of a transmission device 1A according to a second embodiment of the present invention. The transmission device 1A of the second embodiment differs from the transmission device 1 of the first embodiment in that the lubrication passage 10 is provided with an oil reservoir 38 and an opening 40 as described later. Hereinafter, description of these elements will be made in detail. Features corresponding to those of the first embodiment are denoted with like reference numerals, and description thereof is omitted.

The lubrication target T of the second embodiment is illustrated in a divided manner as a first lubrication target 42 and a second lubrication target 44. It should be noted the number of the lubrication target T is not limited to this. For example, the second lubrication target 44 may be omitted. Alternatively, the number of the lubrication target T may be 3 or more. In this embodiment, the first lubrication target 42 rotates at a higher speed than that of the second lubrication target 44. In particular, the first lubrication target 42 is preferably a part of the transmission gear 4 which rotates at highest speed. For example, the first lubrication target 42 preferably includes a gear to which rotation of an engine (not illustrated) is inputted and a bearing for the gear.

The supply ports 12 of the second embodiment include a first supply port 46 for supplying the oil OL to the first lubrication target 42 and a second supply port 48 for supplying the oil OL to the second lubrication target 44. It should be noted that the number of the supply ports 12 is not limited to this. For example, where the second lubrication target 44 is omitted, the second supply port 48 may also be omitted. Alternatively, where the number of the lubrication target T is 3 or more, there may be 3 or more supply ports 12. The first supply port 46 is provided right above the first lubrication target 42. The expression "provided right above" used herein mean that the first supply port 46 is provided above the first lubrication target 42 and within a range where the oil OL dripped from the first supply port 46 under the influence of gravity during dry-run time reaches the first lubrication target 42. That is, the expression "right above" includes horizontal deviation in the range where the oil OL dripped by gravity reaches the first lubrication target 42. In the second embodiment, the first supply port 46 is configured to drip the oil OL to the first lubrication target 42 during dry-run time.

The oil reservoir 38 is disposed upstream of the first supply port 46 in the lubrication passage 10. Specifically, the oil reservoir 38 is disposed upstream of the first supply port 46 and downstream of the second supply port 48 in the lubrication passage 10. The oil reservoir 38 is disposed inside the casing 2. Specifically, the oil reservoir 38 is provided in the second internal passage part 26. During normal time, the oil reservoir 38 retains the oil OL thereinside. During dry-run time, the oil OL retained in the oil reservoir 38 is dripped to the first lubrication target 42 through the first supply port 46. The volume of the oil reservoir 38 may be suitably selected in accordance with a required dry-run capability.

In the second embodiment, the oil reservoir 38 is configured as a box-like tank. The oil reservoir 38, however, is not limited to this configuration. For example, the oil reservoir 38 may be formed by increasing the diameter of the conduit(s) constituting the lubrication passage 10. Thus, the oil reservoir 38 has a larger passage area (cross-sectional area) than those of the conduits located upstream and downstream of the oil reservoir 38, and has a greater amount of the oil OL storage per a unit length (the same length) than those of the conduits located upstream and downstream of the oil reservoir. Alternatively, the oil reservoir 38 may be integrally provided with a side wall or an upper wall of the casing 2.

In the second embodiment, the box-like oil reservoir 38 is formed with an inlet 37 in an upper wall 38*a* thereof and with an outlet 39 in a lower wall 38*b* thereof. That is, the lubrication passage 10 leading to the opening 40 is connected to the upper wall 38*a* of the oil reservoir 38, and the lubrication passage 10 leading to the first supply port 46 is connected to the lower wall 38*b* of the oil reservoir 38. The oil reservoir 38, however, is not limited to this configuration. For example, the outlet 39 of the reservoir 38 may be provided in a lower portion of a side wall 38*c*, instead of the lower wall 38*b*.

The opening 40 is provided upstream of the outlet 39 of the oil reservoir 38 and above the outlet 39 of the oil reservoir 38 in the lubrication passage 10. In the present embodiment, the opening 40 is provided upstream of the oil reservoir 38 and above the oil reservoir 38 in the lubrication passage 10. The opening 40 is disposed inside the casing 2. Specifically, the opening 40 is defined within the inner space SP. As long as the opening 40 is located above the outlet 39 of the oil reservoir 38, the opening 40 may be provided in the oil reservoir 38 per se. Even where the opening 40 is provided upstream of the oil reservoir 38 in the lubrication passage 10, as in this embodiment, the opening 40 is not necessarily located right above the oil reservoir 38. That is, the expression "above" used herein means above (i.e. at a higher location) in the vertical direction, and the oil reservoir 38 and the opening 40 may be offset from each other in the horizontal direction. In the second embodiment, the opening 40 is provided downstream of the oil cooler 18 and between the second supply port 48 and the oil reservoir 38.

The opening 40 is configured to inject the oil OL during normal time. Therefore, when the lubrication target T is disposed downstream of the opening 40, the lubrication target T is lubricated during normal time. On the other hand, the opening 40 is configured such that, when the hydraulic pressure P1 in the lubrication passage 10 decreases, specifically, when the hydraulic pressure P1 in the lubrication passage 10 decreases to a pressure P2 in the oil sump 6 (inner space SP), air is taken into the lubrication passage 10 through the opening 40. In the second embodiment, the opening 40 is a through hole provided in a conduit constituting the lubrication passage 10. The opening 40, however, is not limited to this configuration and may be a projected nozzle hole provided in the conduit. Where the opening 40 is configured as a nozzle, a part of the oil can be precisely supplied to the lubrication target T from the opening 40 during normal time.

The oil reservoir 38 and the opening 40 are accommodated in the casing 2 of the transmission device 1A. The opening 40 is provided at least above an underside (lower wall 38*b*) of the oil reservoir 38 and above the first supply port 46. The opening 40 may preferably be provided above a topside (upper wall 38*a*) of the oil reservoir 38. Thus, all the oil OL in the oil reservoir 38 can be supplied to the first lubrication target 42 during dry-run time. The lubrication passage 10 between the opening 40 and the oil reservoir 38 may be partially located above the opening 40. In such a case, however, a part of the oil OL that is located above the opening 40 in the lubrication passage 10 moves reversely and flows out from the opening 40 during dry-run time. Therefore, the lubrication passage 10 between the opening 40 and the oil reservoir 38 is preferably provided below the opening 40.

The first supply port 46 is provided at least below the topside (upper wall 38*a*) of the oil reservoir 38 and below the opening 40. The term "below" used herein refers to a lower location in the vertical direction, regardless of horizontal locations. If, however, the first supply port 46 is provided above the underside (lower wall 38*b*) of the oil reservoir 38, the oil OL that is retained below the first supply port 46 in the oil reservoir 38 is not supplied to the first lubrication target 42 during dry-run time. Therefore, the first supply port 46 is preferably provided below the underside (lower wall 38*b*) of the oil reservoir 38. For the above reasons, the opening 40 is preferably provided above the topside of the oil reservoir 38, and the first supply port 46 is preferably provided below the underside of the oil reservoir 38. Thus, all the oil OL in the oil reservoir 38 can be supplied to the first lubrication target 42 during dry-run time. The discharge passage 34 of the second embodiment may be provided with a restriction part 36, as in the first embodiment.

Figure 4:
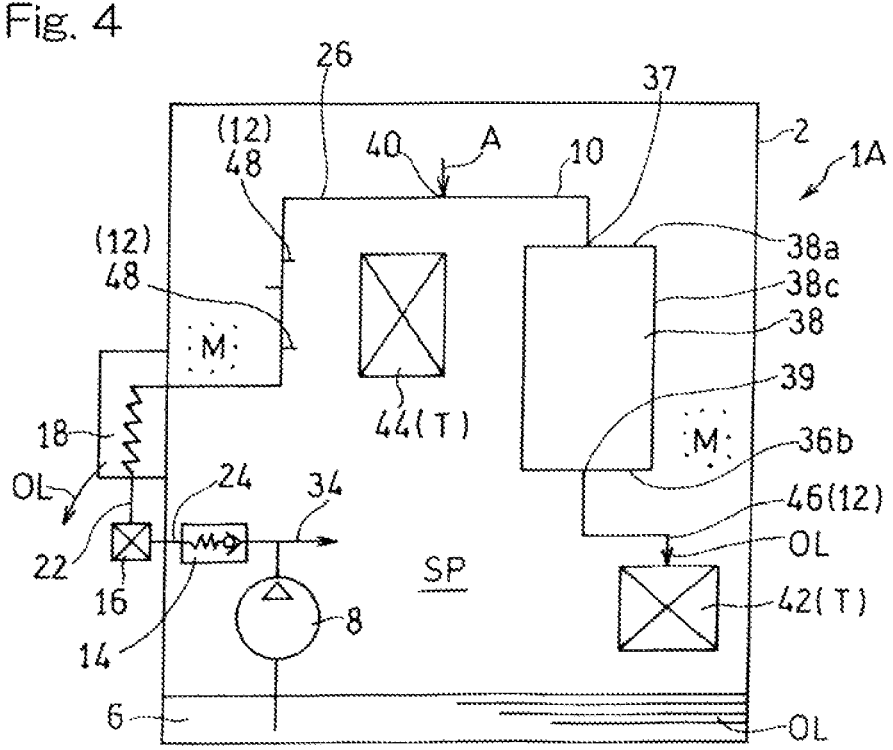
FIG. 4 is a simplified system diagram illustrating a state of the lubrication system during dry-run time.

Referring to FIG. 3 and FIG. 4, the operation of the transmission device 1A in the second embodiment will be described. FIG. 3 shows flow of the oil OL during normal time, and FIG. 4 shows flow of the oil OL during dry-run time. During the normal time as shown in FIG. 3, the oil OL in the oil sump 6 is sucked and discharged by the lubrication pump 8. The oil OL discharged by the lubrication pump 8 passes through the lubrication passage 10 to be supplied to the lubrication target T.

The flow of the oil OL during normal time in this embodiment will be described in detail. The oil OL discharged by lubrication pump 8 is filtered by the oil filter 16 outside the casing 2 and is then cooled by the oil cooler 18. The oil OL cooled by the oil cooler 18 is returned into the casing 2, and a part of the oil is supplied to the second lubrication target 44 from the second supply port 48. During normal time, the oil OL is injected from the second supply port 48 under the hydraulic pressure in the lubrication passage 10.

The oil OL further flows within the lubrication passage 10, and a part of the oil OL is injected from the opening 40 into the inner space SP of the casing 2. The rest of the oil OL further flows within the lubrication passage 10 to reach the oil reservoir 38. A predetermined amount of the oil OL is retained in the oil reservoir 38. The oil OL having passed the oil reservoir 38 is supplied to the first lubrication target 42 from the first supply port 46. During normal time, the oil OL is injected from the first supply port 46 under the hydraulic pressure in the lubrication passage 10. The oil OL supplied from the first and second supply ports 46, 48 lubricates the first lubrication target 42 and the second lubrication target 44, and then, are collected in the oil sump 6. A part of the oil OL is injected into the inner space SP from the supply ports 46, 48 and the opening 40, and remains in the inner space SP as the oil mist M.

As shown in FIG. 4, when an oil leak occurs from the oil cooler 18 outside the casing 2, the hydraulic pressure P1 in the lubrication passage 10 decreases. When the hydraulic pressure P1 in the lubrication passage 10 decreases to the predetermined value V1, the direction control valve 14 closes. Thus, the oil supply from the lubrication pump 8 is stopped or halted, thereby preventing the oil OL from further flowing out of the casing 2.

Further, when the hydraulic pressure P1 in the lubrication passage 10 decrease to the pressure P2 in the oil sump 6 (inner space SP), air A is taken into the lubrication passage 10 through the opening 40. Thus, the oil OL downstream of the opening 40 in the lubrication passage 10 flows into the oil reservoir 38 under the influence of gravity. The oil OL in the oil reservoir 38 is then dripped from the first supply port 46 to the first lubrication target 42 under the influence of gravity. Since a hydraulic pressure P3 in the oil reservoir 38 is maintained at the same pressure as the pressure P2 in the oil sump 6 (inner space SP) through the opening 40, stable dripping lubrication is achieved.

The second embodiment provides the same advantage as that of the first embodiment described above. Furthermore, according to the second embodiment, during the normal time as in FIG. 3, the oil OL in the lubrication passage 10 is supplied to the first lubrication target 42 from the first supply port 46 through the oil reservoir 38. During normal time, a predetermined amount of the oil OL is retained in the oil reservoir 38. During the dry-run time as in FIG. 4, air A is taken into the lubrication passage 10 through the opening 40. Then, the oil OL in the oil reservoir 38 as well as the oil OL located between the opening 40 and the oil reservoir 38 in the lubrication passage 10 are dripped to the first lubrication target 42 from the first supply port 46 under the influence of gravity. Thus, the common oil reservoir 38 can be used for the oil lubrication during normal time as well as dripping lubrication during dry-run time. Therefore, the dry-run capability can be enhanced with a simple configuration.

That is, the second embodiment makes it possible to suppress outflow of the oil OL in the oil sump 6 and the oil mist M in the inner space SP to the outside of the casing 2 by closing the direction control valve 14 during dry-run time as well as to perform dripping lubrication of the first lubrication target 42 with the oil OL in the oil reservoir 38. Thus, the dry-run capability can be enhanced. It should be noted that the dripping lubrication by use of the oil reservoir 38 is performed in the same manner in the case of not only an oil leak occurring outside, but also an oil leak occurring inside the casing.

The oil sump 6, the lubrication pump 8, the lubrication target T and the oil reservoir 38 are accommodated in the casing 2, and the opening 40 is provided inside the casing 2. Thus, during the normal time as in FIG. 3, the oil OL injected from the opening 40 can be supplied to the lubrication target T disposed in the inner space SP of the casing 2.

The opening 40 of the lubrication passage 10 is provided downstream of the oil cooler 18 disposed outside the casing 2. This makes it possible to supply the oil OL, after cooling by oil cooler 18, to the first lubrication target 42 and to supply the oil OL after cooling to the second lubrication target 44 from a location between the oil cooler 18 and the oil reservoir 38 in the lubrication passage 10, during normal time.

The second supply port 48 for supplying the oil OL to the second lubrication target 44 is provided upstream of the oil reservoir 38 in the lubrication passage 10, and the opening 40 is provided between the second supply port 48 and the oil reservoir 38. This makes it possible to effectively lubricate the first lubrication target 42 of high lubrication priority, during dry-run time.

The first lubrication target 42 and the second lubrication target 44 are rotating members (transmission gear 4) of the transmission device 1A, and a high-speed rotating member that rotates at a higher speed than that of the second lubrication target 44 is made the first lubrication target 42. This makes it possible to concentratedly lubricate, in particular, the high-speed rotating member of high lubrication priority during dry-run time.

The lubrication pump 8 and the direction control valve 14 are provided between the oil sump 6 and the second supply port 48, and the opening 40 is provided between the second supply port 48 and the oil reservoir 38. Therefore, the second supply port 48 arranged below the opening 40 can lubricate the second lubrication target 44 with the returning oil OL during dry-run time.

Although in the second embodiment as shown in FIG. 3 and FIG. 4, the opening 40 is provided upstream of the oil reservoir 38 in the lubrication passage 10, the opening 40 may be defined in the topside (upper wall 38a) of the oil reservoir 38. Further, the opening 40 may be defined in the topside of the side wall 38c of the oil reservoir 38, preferably in above a position at ⅔ of the height of the oil reservoir 38.

The present invention is not limited to the embodiments described above, and various additions, modifications, or deletions may be made without departing from the scope of the invention. Accordingly, such variants are included within the scope of the present invention.

REFERENCE NUMERALS 1, 1A . . . Transmission device
2 . . . Casing
4 . . . Transmission gear (rotating member)
6 . . . Oil sump
8 . . . Lubrication pump
10 . . . Lubrication passage
12 . . . Supply port
14 . . . Direction control valve (check valve)
18 . . . Oil cooler
22 . . . External passage part
24 . . . First internal passage part
26 . . . Second internal passage part
32 . . . Connection portion
34 . . . Discharge passage
36 . . . Restriction part
38 . . . Oil reservoir
39 . . . Outlet of the oil reservoir
40 . . . Opening
42 . . . First lubrication target 44 . . . Second lubrication target
46 . . . First supply port
48 . . . Second supply port
M . . . Oil mist (mist-like oil)
OL . . . Liquid oil
P1 . . . Hydraulic pressure in the lubrication passage
SP . . . Inner space
V1 . . . Predetermined value

What is claimed is:

1. A transmission device for a helicopter comprising:

a casing accommodating a rotating member and having an inner space therein configured to contain oil in a mist form, the casing having an oil sump configured to retain oil in a liquid form;

a lubrication pump provided in the inner space of the casing and configured to suck and discharge the oil from the oil sump;

a supply port provided in the inner space of the casing and configured to inject the oil from the lubrication pump to the rotating member;

a lubrication passage connecting the lubrication pump and the supply port;

a connection portion provided in a part of the lubrication passage, which part is disposed outside the casing;

a direction control valve provided in the inner space of the casing and located downstream of the lubrication pump and upstream of the connection portion in the lubrication passage with respect to a flow direction of the oil, the direction control valve being configured to open the lubrication passage at a normal time when a hydraulic pressure in the lubrication passage exceeds a first predetermined value and to close the lubrication passage at a dry-run time when the hydraulic pressure is equal to or lower than the first predetermined value so as to stop the oil supply from the lubrication pump to the connection portion, the direction control valve being a check valve configured to close the lubrication passage at the dry-run time when a pressure upstream of the check valve is equal to or lower than the first predetermined value; and a discharge passage that is branched at a location between the lubrication pump and the check valve in the lubrication passage and is configured to discharge the oil upstream of the check valve in the lubrication passage into the inner space of the casing, wherein the discharge passage has a restriction part provided therein, the restriction part sets pressure within the discharge passage to a second predetermined value, the second predetermined pressure is lower than the first predetermined value at which the direction control valve closes, the restriction part is configured to adjust the pressure upstream of the direction control valve to be higher than the first predetermined value, and the connection portion is an oil cooler configured to cool the oil in the lubrication passage.

* * * * *